(12) United States Patent
Lee

(10) Patent No.: US 7,956,951 B2
(45) Date of Patent: Jun. 7, 2011

(54) FLAT LIGHT SOURCE UNIT AND LIQUID CRYSTAL DISPLAY DEVICE WITH THE SAME

(75) Inventor: Jong Suck Lee, Suwon Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 193 days.

(21) Appl. No.: 12/216,538

(22) Filed: Jul. 7, 2008

(65) Prior Publication Data

US 2009/0009683 A1 Jan. 8, 2009

(30) Foreign Application Priority Data

Jul. 6, 2007 (KR) .................. 10-2007-0067930

(51) Int. Cl.
*G02F 1/1333* (2006.01)
*F21V 27/02* (2006.01)
(52) U.S. Cl. .......... 349/58; 362/613; 362/630; 362/631
(58) Field of Classification Search .............. 349/58–60; 362/632–634, 612, 613, 630, 631
See application file for complete search history.

(56) References Cited

U.S. PATENT DOCUMENTS

| 6,268,998 | B1 * | 7/2001 | Cho ...................... 361/679.23 |
| 6,283,612 | B1 * | 9/2001 | Hunter .......................... 362/240 |
| 6,719,436 | B1 * | 4/2004 | Lin et al. ....................... 362/612 |
| 7,448,784 | B2 * | 11/2008 | Tanaka .......................... 362/611 |
| 7,542,104 | B2 * | 6/2009 | Cai et al. ......................... 349/58 |
| 2004/0252252 | A1 * | 12/2004 | Lee et al. ......................... 349/58 |
| 2008/0246036 | A1 * | 10/2008 | Yamazaki et al. ............... 257/72 |
| 2009/0002595 | A1 * | 1/2009 | Kim ............................... 349/61 |

FOREIGN PATENT DOCUMENTS

| JP | 8-248436 A | 9/1996 |
| JP | 2001-184924 A | 7/2001 |
| KR | 2002-0045764 A | 6/2002 |
| KR | 2007-0003971 A | 1/2007 |

* cited by examiner

*Primary Examiner* — Michelle R Connelly Cushwa
(74) *Attorney, Agent, or Firm* — McKenna Long & Aldridge LLP

(57) ABSTRACT

A flat light source unit includes a PCB on which at least one light emitting diode is mounted, a connection cord electrically connected to a conductive pattern on the PCB to supply a drive voltage to the at least one light emitting diode, and a mold formed on the printed circuit board to encompass a part of the connection cord.

11 Claims, 4 Drawing Sheets

FLAT LIGHT SOURCE UNIT AND LIQUID CRYSTAL DISPLAY DEVICE WITH THE SAME

This application claims priority under 35 U.S.C. 119 to Korean Patent Application No. 10-2007-0067930, filed on Jul. 6, 2007, which is hereby incorporated by reference for all purposes as if fully set forth herein.

BACKGROUND OF THE INVENTION

1. Field of the Invention

The present invention relates to a light emitting device, and particularly to a flat light source unit which emits light progressing in a plane and a liquid crystal display device with the flat light source unit.

2. Discussion of the Related Art

Related art flat light source units provide non-luminescent display devices with light progressing in a plane. Liquid crystal display device are one of the non-luminescent display devices and use the flat light source unit as a backlight unit.

The flat light source unit uses an external electrode fluorescent lamp (EEFL) and a cold cathode fluorescent lamp (CCFL) as a light element. The EEFL and CCFL are tube type lamps which consume relatively large power during emission of light. In addition, the amount of light emitted from the tube type lamps varies very greatly according to temperature.

To address the disadvantages of the tube type lamps, a flat light source unit using a light emitting diode (LED) array as the light device has been suggested. LEDs consume quite a low power compared to the tube type lamp. The deviation in the amount of radiated light of the LED according to the change of temperature is remarkably small compared to the tube type lamp. In terms of the above, recent flat light source units mainly use LEDs.

The LED array of a flat light source unit includes a plurality of LEDs arranged on a printed circuit board (hereinafter, referred to as the "PCB"). The PCB receives a drive voltage to be supplied to the LEDs, from a light source drive circuit unit. To this end, the PCB of the LED array is electrically connected to the light source drive circuit unit via a connection cord.

The connection cord is typically attached to the PCB by soldering so as to be electrically connected to a conductive pattern on the PCB. The soldered connection cord is frequently detached from the PCB due to an excessive force or the carelessness of a worker until the LED array is installed in a case (or housing) of the flat light source unit.

A shrink tube for encasing a connection portion between the connection cord and the PCB is used to prevent the detachment of the PCB of the connection cord. The shrink tube requires a plurality of processes of encasing an end portion of the connection cord using the shrink tube before soldering, heating the shrink tube after the soldering, widening an end of the heated shrink tube, and encasing part of the PCB using the widened shrink tube. Accordingly, the manufacturing time of the flat light source unit and the LCD device with the flat light source unit increases and the manufacturing costs are raised. In addition, since the shrink tube encompasses a part of the PCB, the size of the flat light source unit as well as the LCD device with the flat light source unit is increased as much as the thickness of the shrink tube.

In another method, as the connection cord is inserted into a connection slot provided on the PCB, the connection cord is electrically connected to the conductive pattern of the PCB. The connection cord inserted in the slot may be easily detached from the PCB due to the carelessness of a worker during the process of manufacturing the flat light source unit and the LCD device with the flat light source unit and an external impact after the flat light source unit and the LCD device with the flat light source unit are manufactured. As a result, the flat light source unit having the slot insertion type connection cord and the LCD device with the flat light source unit are easily broken down so that reliability of the flat light source unit and the LCD device with the flat light source unit is deteriorated.

SUMMARY OF THE INVENTION

Accordingly, the present invention is directed to a flat light source unit that substantially obviates one or more of problems due to the limitations and disadvantages of the related art and a LCD device with the same.

An advantage of the present invention is to provide a flat light source unit which simplifies the manufacturing process and simultaneously is suitable for maintaining a stable electrical connection state.

Another advantage of the present invention is to provide an LCD device which simplifies the manufacturing process and simultaneously is suitable for maintaining a stable electrical connection state.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purposes of the present invention, a flat light source unit includes a printed circuit board on which at least one light emitting diode is mounted, a connection cord electrically connected to a conductive pattern on the printed circuit board to supply a drive voltage to the at least one light emitting diode, and a mold formed on the printed circuit board to encompass a part of the connection cord.

The connection cord may be connected to the conductive pattern by soldering. The mold may have a thickness that is at least two times greater than the thickness of the connection cord. The mold may be formed of silicon. The flat light source unit may further comprise a slot socket mounted on the printed circuit board and connected to the conductive pattern and a slot film installed at one end of the connection cord and accommodated in the slot socket. The mold may encompass the slot socket and part of the slot film. The flat light source unit may further comprise a light guide panel allowing light emitted from the at least one light emitting diode to progress in a plane.

In another aspect of the present invention, a liquid crystal display device includes a liquid crystal panel displaying an image and a backlight unit emitting a light in a plane to the rear surface of the liquid crystal panel. The backlight unit includes a connection cord which is electrically connected to a conductive pattern on a printed circuit board on which at least one light emitting diode is mounted to supply a drive voltage to the at least one light emitting diode, and a mold formed on the printed circuit board to encompass a part of the connection cord.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principles of the invention.

In the drawings.

DETAILED DESCRIPTION OF THE ILLUSTRATED EMBODIMENTS

Reference will now be made in detail to the embodiments of present disclosure, examples of which are illustrated in the accompanying drawings. Wherever possible, the same reference numbers will be used throughout the drawings to refer to the same or like parts.

Figure 1:
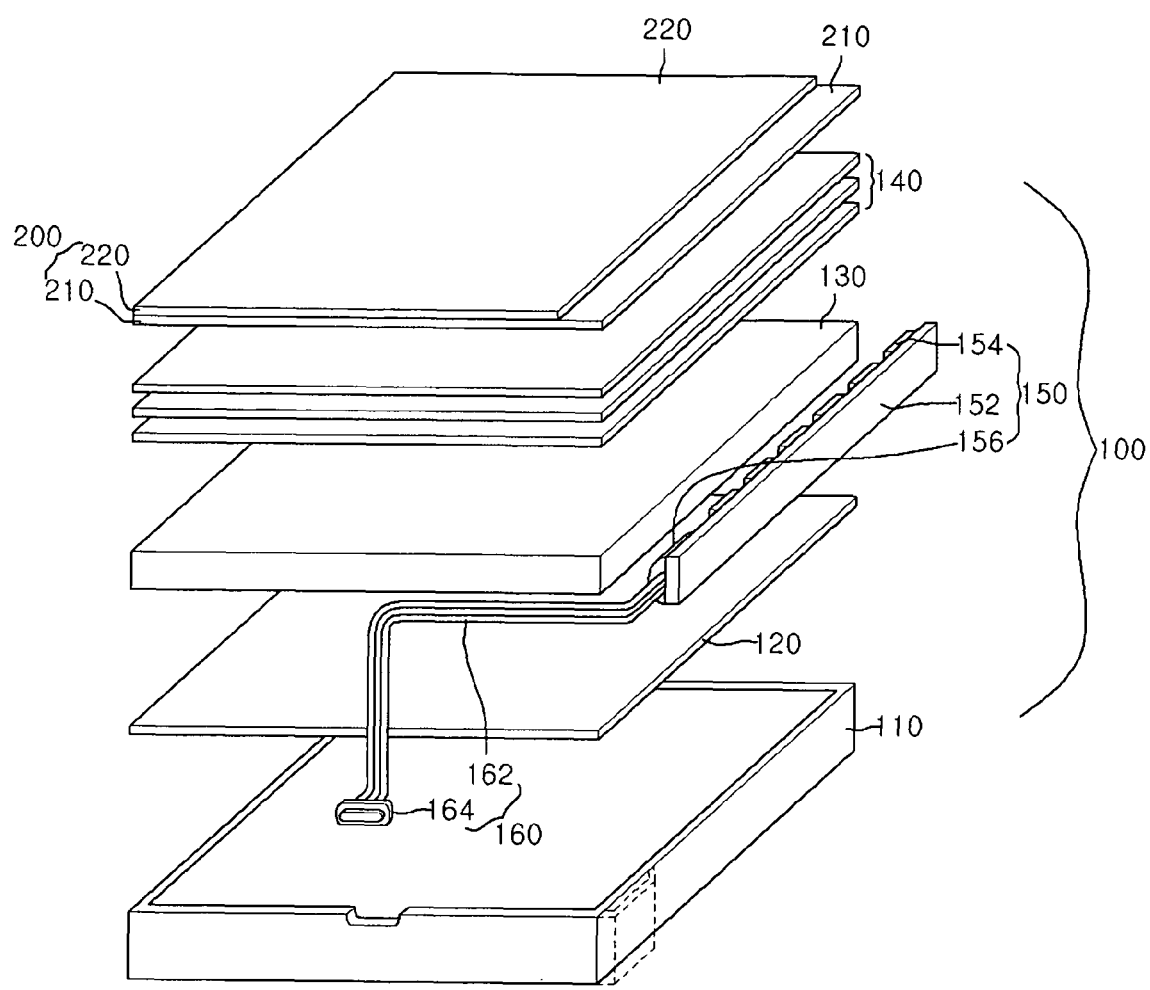
FIG. 1 is an exploded perspective view of an LCD device with a flat light source unit according to an embodiment.
Figure 2A:
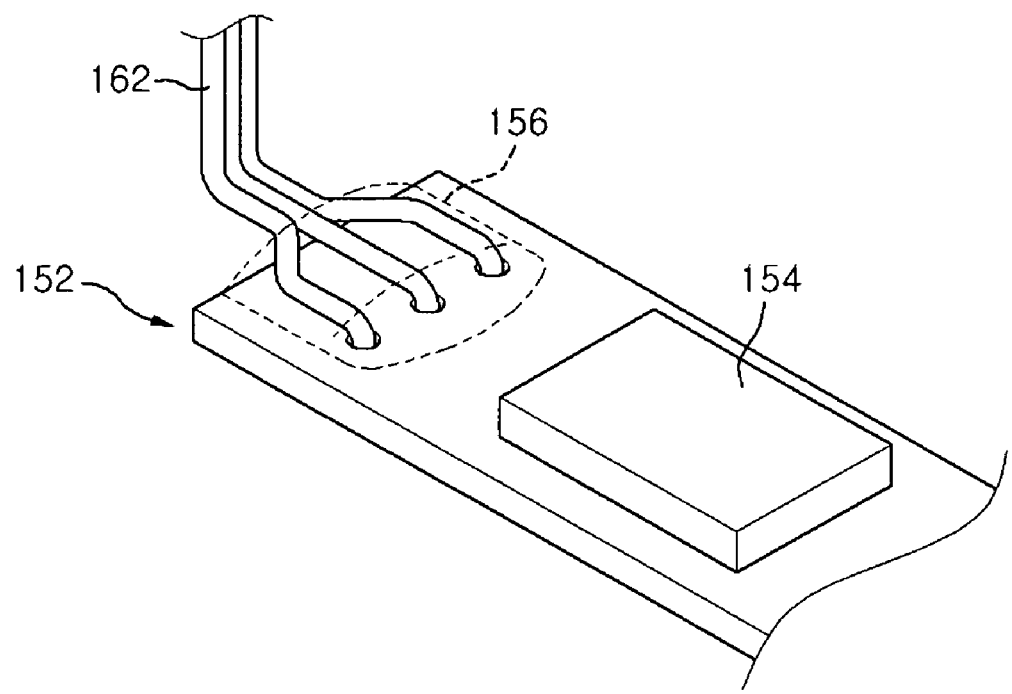
FIG. 2A is a perspective view of the LED array and the connection cord of FIG. 1.
Figure 2B:
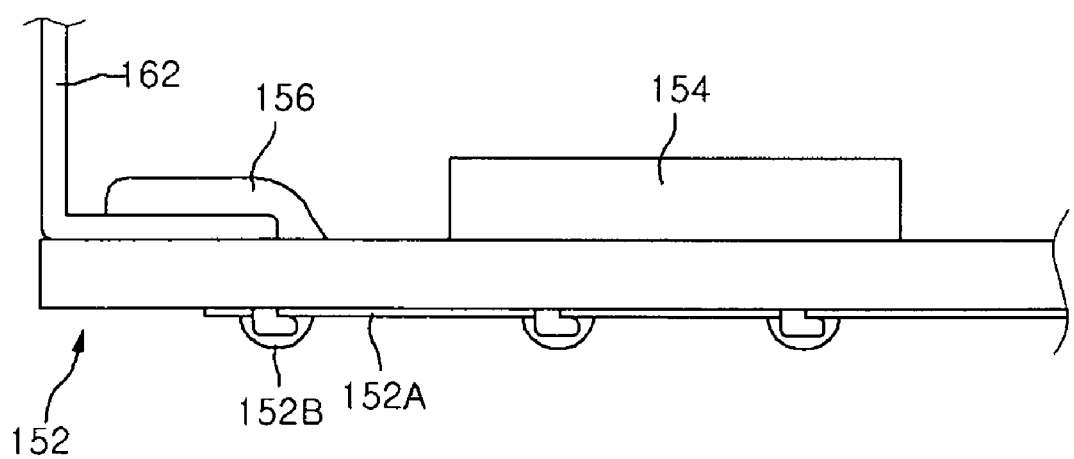
FIG. 2B is a cross-sectional view of the LED array and the connection cord of FIG. 1.

FIG. 1 is an exploded perspective view of an LCD device with a flat light source unit according to an embodiment. FIG. 2A is a perspective view of the LED array and the connection cord of FIG. 1. FIG. 2B is a cross-sectional view of the LED array and the connection cord of FIG. 1.

Referring to FIG. 1, an LCD device includes a liquid crystal panel 200 that is installed on a backlight unit 100. The backlight unit 100 includes a reflect sheet 120, a light guide panel 130, and a plurality of optical sheets 140, which are sequentially installed in a bottom case 110. Also, the backlight unit 100 includes an LED array 150 positioned between a side wall of the bottom case 110 and a side wall of the light guide panel 130.

The light guide panel 130 makes light emitted by the LED array 150 progress in a plane toward the rear surface of the liquid crystal panel 200. The reflect sheet 120 reflects the light progressing from the light guide panel 130 onto the surface of the bottom case 110 to progress back to the light guide panel 130. The reflect sheet 120 improves the efficiency of the use of light by the LED array 150. The optical sheets 140 make the light from the light guide panel 130 to be uniformly irradiated onto the rear surface of the liquid crystal panel 200. Also, the optical sheets 140 make the light from the light guide panel 130 to progress perpendicularly to the rear surface of the liquid crystal panel 200.

The liquid crystal panel 200 displays an image corresponding to video data by adjusting a transmitted amount (or transmittance) of the light from the optical sheets 140, for respective pixel areas. The liquid crystal panel 200 includes a liquid crystal material layer (not shown) interposed between a lower glass substrate 210 and an upper glass substrate 220. The liquid crystal material layer adjusts the amount of transmitted light according to a drive voltage. The liquid crystal panel 200 includes a pixel electrode matrix (not shown) for applying a pixel drive voltage to each pixel area of the liquid crystal material layer. In addition, the liquid crystal panel 200 includes a plurality of thin film transistors (TFTs; not shown) for switching the pixel drive voltage supplied to a pixel electrode for each pixel area. The TFTs can be included in the pixel electrode matrix. In other words, the TFTs and the pixel electrode matrix are either formed all on the lower glass substrate 210 or formed on the lower and upper glass substrates 210 and 220, respectively. The liquid crystal panel 200 may be partially encompassed by a top case (not shown). The top case encompasses the edge and side surfaces of the liquid crystal panel 200 and a part of the side surface of the backlight unit 100. The top case protects the liquid crystal panel 200 and the backlight unit 100 from external impacts.

To emit light toward the side surface of the light guide panel 130, the LED array 150 includes a plurality of LEDs 154 arranged in a line on a PCB 152. A conductive pattern 152A connected to the LEDs 154 are formed on the rear surface of the PCB 152, as shown in FIG. 2B. The LEDs 154 are arranged on the surface of the PCB 152, as shown in FIG. 2A. Anode and cathode terminals of each of the LEDs 154 are exposed down from the conductive pattern 152A by penetrating the PCB 152, as shown in FIG. 2B. The exposed anode and cathode terminals of the LEDs 154 are soldered by using a solder 152B and thus electrically connected to the conductive pattern 152A. The conductive pattern 152A on the PCB 152 is electrically connected to a light source drive circuit unit (not shown) via a connection cord 160. The PCB 152 supplies commonly the LEDs 154 with a light source drive signal from the light source drive circuit unit. All of the LEDs 154 on the PCB 152 emit a certain amount of light corresponding to the voltage level or current amount of the light source drive signal from the light source drive circuit unit.

The connection cord 160 includes at least two connection lead wires 162 and a connection plug 164 provided at one ends of the connection lead wires 162. The connection plug 164 is engaged with (or inserted to) a connecting jack (not shown) included in the light source drive circuit unit so that the one ends of the connection lead wires 162 are electrically connected to the light source drive circuit unit. The other ends of the connection lead wires 162 are exposed out of the conductive pattern 152A on the rear surface of the PCB 152 via corresponding through holes in the PCB 152, as shown in FIGS. 2A and 2B. The exposed other ends of the connection lead wires 162 are soldered to the conductive pattern 152A by the solder 152B and thus electrically connected to the conductive pattern 152A.

A mold 156 is formed on the surface of the PCB 152 around the through holes into which the connection lead wires 162 are inserted. The mold 156 is formed to have a thickness enough to sufficiently encompass the connection lead wires 162, for example, a thickness that is at least two times greater than that of each of the connection lead wires 162. Preferably, the thickness of the mold 156 is at least three to four times greater than that of each of the connection lead wires 162. The mold 156 is formed of an insulating material such as silicon which can adhere to the surface of the PCB 152 in a liquid state in such a manner to encompass the connection lead wires 162 and be hardened into a solid state at normal temperature.

The mold 156 adhesively fixes the other ends of the connection lead wires 162 to the surface of the PCB 152 of the LED array 150. Accordingly, the connection cord 160 is not detached from the PCB 152 of the LED array 150 in spite of an external separation force due to the carelessness of a user or a worker or a separation force due to the elasticity of the connection cord 160 itself. As a result, the flat light source unit used as a backlight unit of an LCD device can prevent generation of a defective electrical connection between a light element and a drive circuit thereof and further improve reliability of the device.

Also, since the mold 156 is formed on the PCB 152 due to the adhesion of the mold material in a liquid state, the manufacturing process of the flat light source unit and the LCD device using the flat light source unit as a backlight unit can be simplified.

In addition, as the connection lead wires 162 are fixed by the mold 156 formed on the surface of the PCB 152 of the LED array 150, a protruding portion of the bottom case 110, as indicated by a dotted line in FIG. 1, which is avoidably generated due to the use of the shrinking tube can be removed. In other words, the mold 156 on the surface of the PCB 152 decreases the width or length of the bottom case 110 as much as the thickness of the shrinking tube. As a result, the sizes of the flat light source unit and the LCD device using the flat light source unit as a backlight unit can be reduced.

Figure 3:
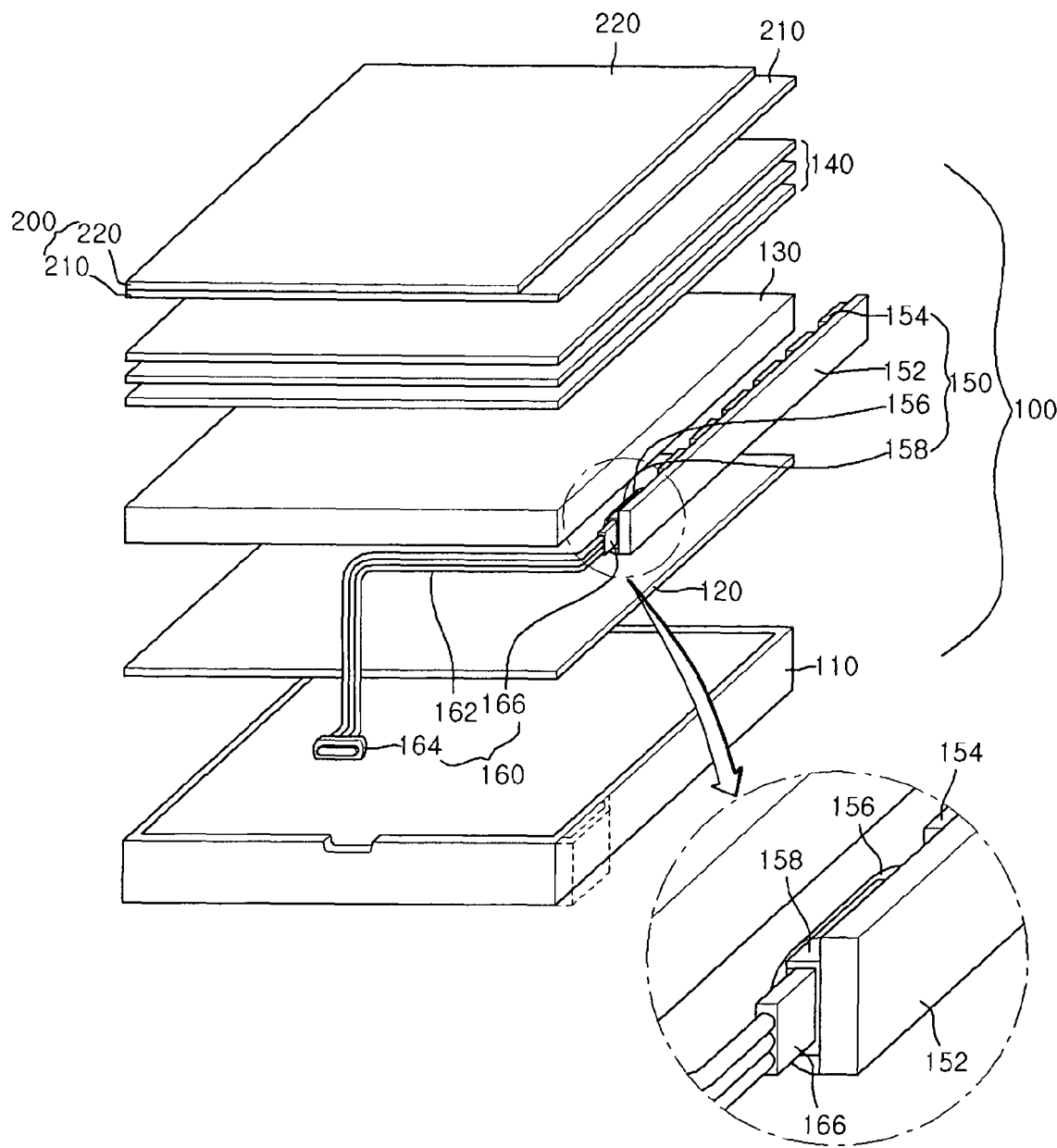
FIG. 3 is an exploded perspective view of an LCD device with a flat light source unit according to another embodiment.
Figure 4A:
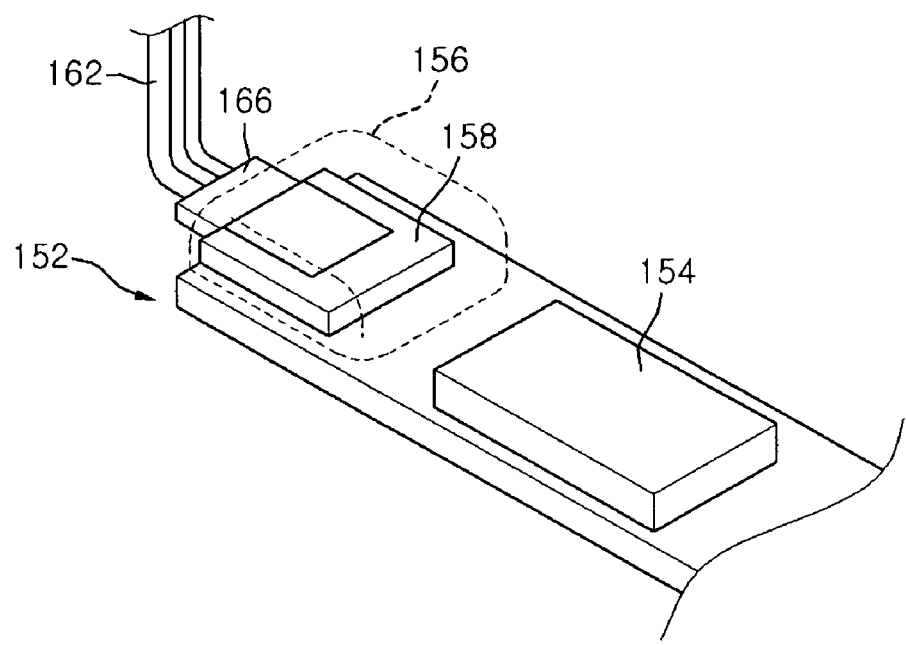
FIG. 4A is a perspective view of the LED array and the connection cord of FIG. 3.
Figure 4B:
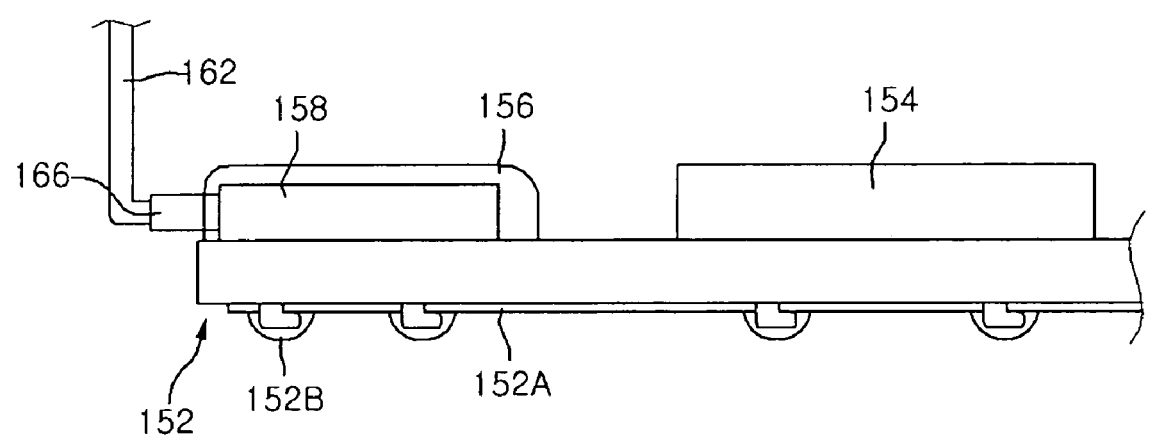
FIG. 4B is a cross-sectional view of the LED array and the connection cord of FIG. 3.

FIG. 3 is an exploded perspective view of an LCD device with a flat light source unit according to another embodiment. FIG. 4A is a perspective view of the LED array and the connection cord of FIG. 3. FIG. 4B is a cross-sectional view of the LED array and the connection cord of FIG. 3.

Referring to FIGS. 3, 4A, and 4B, the LCD device of the present embodiment has substantially the same structure as the LCD device shown in FIGS. 1, 2A, and 2B, except that the LCD device of the present embodiment additionally includes a slot film 166 installed at the other end of the connection lead wires 162 and a connection slot socket 158 provided on the PCB 152 of the LED array 150 and that the mold 156 encompasses part of the slot film 166 and the connection slot socket 158. The constituent elements shown in FIGS. 3, 4A, and 4B having the same structures, operations, and functions as those of the constituent elements shown in FIGS. 1, 2A, and 2B are referred to by using the same reference numerals and their detailed descriptions will be omitted because they are already clearly described in the descriptions with reference to FIGS. 1, 2A, and 2B.

The connection slot socket 158 is disposed on the surface of the PCB 152 as shown in FIG. 4A. Connection terminals of the connection slot socket 158 penetrate the PCB 152 and are exposed down from the conductive pattern 152A, as shown in FIG. 4B. The exposed connection terminals of the connection slot socket 158 are soldered by the solder 152B and thus electrically connected to the conductive pattern 152A. The connection slot socket 158 electrically connects the slot film 166 of the connection cord 160 to the conductive pattern 152A on the rear surface of the PCB 152. Accordingly, the conductive pattern 152A is electrically connected to a light source drive circuit unit (not shown) via the connection slot socket 158, the slot film 166, the connection lead wires 162, and the connection plug 164. The conductive pattern 152A on the rear surface of the PCB 152 supplies commonly the LEDs 154 with a light source drive signal from the light source drive circuit unit. All of the LEDs 154 on the PCB 152 emits a certain amount of light corresponding to the voltage level or current amount of the light source drive signal from the light source drive circuit unit.

In addition to the connection plug 164 located at ends of the connection lead wires 162 which are at least two, the connection cord 160 may further include the slot film 166 installed at the other ends of the connection lead wires 162. The slot film 166 installed at the other ends of the connection lead wires 162, as shown in FIGS. 2A and 2B, is inserted into the connection slot socket 158 on the PCB 152 such that the connection terminals of the connection slot socket 158 can electrically contact corresponding ones of the connection lead wires 162. Accordingly, the conductive pattern 152A on the rear surface of the PCB 152 is electrically connected to the light source drive circuit unit via the connection slot socket 158, the slot film 166, the connection lead wires 162, and the connection plug 164.

The connection slot socket 158 in which the slot film is inserted is encompassed by the mold 156. The mold 156 is formed to have a thickness enough to sufficiently encompass the connection slot socket 158 on the PCB 152, for example, a thickness corresponding to at least 1.2 times greater than the height of the connection slot socket 158. Preferably, the thickness of the mold 156 is about 1.5 times greater than the height of the connection slot socket 158. The mold 156 is formed of an insulating material such as silicon which can adhesively contact the surface of the PCB 152 in a liquid state in such a manner to encompass the overall surface of the connection slot socket 166 and be hardened into a solid state at normal temperature.

The mold 156 fixes the slot film 166 inserted in the connection slot socket 158. In particular, when the connection slot socket 158 is provided with a hinge type lid (not shown), the mold 156 restricts pivot motion of the hinge type lid so that the slot film 166 can be stably inserted in the connection slot socket 158. Accordingly, the connection cord 160 is not detached from the PCB 152 of the LED array 150 in spite of an external separation force due to the carelessness of a user or a worker or a separation force due to the elasticity of the connection cord 160 itself. As a result, the flat light source unit used as a backlight unit of an LCD device can prevent generation of a defective electrical connection between a flat light source unit and a drive circuit thereof and further improve reliability of the device.

Also, since the mold 156 is formed on the PCB 152 due to the adhesion of the mold material in a liquid state, the manufacturing process of the flat light source unit and the LCD device using the flat light source unit as a backlight unit can be simplified.

In addition, as the LED array 150 secondarily fixes the slot film 166 of the connection lead wires 162 by the mold 156 formed on the surface of the PCB 152, a protruding portion of the bottom case 110, as indicated by a dotted line in FIG. 3, which is avoidably generated due to the use of the shrinking tube can be removed. In other words, the mold 156 on the surface of the PCB 152 decreases the width or length of the bottom case 110 as much as the thickness of the shrinking tube. As a result, the sizes of the flat light source unit and the LCD device using the flat light source unit as a backlight unit can be reduced.

As described above, in the flat light source unit according to embodiments and the liquid crystal display device having the flat light source unit, the mold enables either the other end of the connection cord to be secondarily attached and fixed to the surface of the PCB or the slot film inserted in the connection slot socket on the PCB to be secondarily fixed. Accordingly, the connection cord is not detached from the PCB of the LED array in spite of an external separation force due to the carelessness of a user or a worker or a separation force due to the elasticity of the connection cord itself. As a result, the flat light source unit used as a backlight unit of an LCD device can prevent generation of a defective electrical connection between a flat light source unit and a drive circuit thereof and further improve reliability of the device.

Also, since the mold is formed on the PCB due to the adhesion of the mold material in a liquid state, the manufacturing process of the flat light source unit and the LCD device using the flat light source unit as a backlight unit can be simplified.

In addition, as the LED array secondarily fixes the slot film of the connection lead wires by the mold formed on the surface of the PCB, a protruding portion of the bottom case which is avoidably generated due to the use of the shrinking tube can be removed. In other words, the mold on the surface of the PCB decreases the sizes of the flat light source unit and the LCD device case with the flat light source unit as much as the thickness of the shrinking tube.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A flat light source unit comprising:
   a printed circuit board on which at least one light emitting diode is mounted;
   a connection cord electrically connected to a conductive pattern on the printed circuit board to supply a drive voltage to the at least one light emitting diode; and
   a mold formed on the printed circuit board to encompass a part of the connection cord,
   wherein the light emitting diode is mounted on a front surface of the printed circuit board,
   wherein the connection cord is disposed on the front surface of the printed circuit board,
   wherein the conductive pattern is formed on a rear surface of the printed circuit board,
   wherein the connection cord is electrically connected to the conductive pattern on the rear surface of the printed circuit board,
   wherein the mold is only formed on the front surface of the printed circuit board.

2. The flat light source unit of claim 1, wherein the connection cord is connected to the conductive pattern by soldering.

3. The flat light source unit of claim 1, wherein the mold has a thickness that is at least two times greater than the thickness of the connection cord.

4. The flat light source unit of claim 1, wherein the mold is formed of silicon.

5. The flat light source unit of claim 1, further comprising:
   a slot socket mounted on the printed circuit board and connected to the conductive pattern; and
   a slot film installed at one end of the connection cord and accommodated in the slot socket.

6. The flat light source unit of claim 5, wherein the mold encompasses the slot socket and the slot film.

7. The flat light source unit of claim 1, further comprising a light guide panel allowing the light from the at least one light emitting diode to progress in a plane.

8. A liquid crystal display device comprising:
   a liquid crystal panel displaying an image; and
   a backlight unit irradiating a light in a plane to the liquid crystal panel, the unit including,
   a connection cord electrically connected to a conductive pattern on a printed circuit board on which at least one light emitting diode is mounted to supply a drive voltage to the at least one light emitting diode; and
   a mold formed on the printed circuit board to encompass a part of the connection cord,
   wherein the light emitting diode is mounted on a front surface of the printed circuit board,
   wherein the connection cord is disposed on the front surface of the printed circuit board,
   wherein the conductive pattern is formed on a rear surface of the printed circuit board,
   wherein the connection cord is electrically connected to the conductive pattern on the rear surface of the printed circuit board,
   wherein the mold is only formed on the front surface of the printed circuit board.

9. The liquid crystal display device of claim 8, wherein the connection cord is connected to the conductive pattern by soldering.

10. The liquid crystal display device of claim 8, wherein the backlight unit includes:
    a slot socket mounted on the printed circuit board and connected to the conductive pattern; and
    a slot film installed at an end of the connection cord and accommodated in the slot socket.

11. The liquid crystal display device of claim 10, wherein the mold encompasses the slot socket and the slot film.

* * * * *